(12) United States Patent
Chupp

(10) Patent No.: US 8,988,318 B2
(45) Date of Patent: Mar. 24, 2015

(54) LCD BIT DISPLAY AND COMMUNICATION SYSTEM

(75) Inventor: Christopher Chupp, O'Fallon, MO (US)

(73) Assignee: Design Manufacture Distribution, St. Charles, MO (US)

( * ) Notice: Subject to any disclaimer, the term of this patent is extended or adjusted under 35 U.S.C. 154(b) by 117 days.

(21) Appl. No.: 13/137,234

(22) Filed: Jul. 29, 2011

(65) Prior Publication Data

US 2013/0028608 A1    Jan. 31, 2013

(51) Int. Cl.
*G09G 3/04* (2006.01)
*H04B 10/116* (2013.01)
*G06K 9/18* (2006.01)

(52) U.S. Cl.
CPC .............. *H04B 10/116* (2013.01); *G06K 9/183* (2013.01)
USPC .............. 345/34; 398/130; 398/182; 382/182

(58) Field of Classification Search
None
See application file for complete search history.

(56) References Cited

U.S. PATENT DOCUMENTS

| 4,403,869 | A | * | 9/1983 | Crutcher | 368/10 |
| 4,511,259 | A | * | 4/1985 | Horiuchi | 368/10 |
| 6,177,922 | B1 | * | 1/2001 | Schiefer et al. | 345/698 |
| 6,525,698 | B1 | * | 2/2003 | Takechi et al. | 345/1.2 |
| 7,434,724 | B2 | * | 10/2008 | Lane | 235/375 |
| 7,967,211 | B2 | * | 6/2011 | Challa et al. | 235/462.46 |
| 8,155,455 | B2 | * | 4/2012 | Huang et al. | 382/232 |
| 8,342,406 | B2 | * | 1/2013 | Saunders et al. | 235/462.01 |
| 2007/0145137 | A1 | * | 6/2007 | Mrowiec | 235/462.01 |
| 2009/0159658 | A1 | * | 6/2009 | Cheung et al. | 235/375 |

* cited by examiner

*Primary Examiner* — Jason Olson
(74) *Attorney, Agent, or Firm* — Jonathan E. Grant; Grant Patent Services

(57) ABSTRACT

A communication system and method are described for transmitting data from a display in a bit transmission data format to a machine vision system. The described system and method allows for the process and further application of a larger amount of data faster and more reliably than by use of the human readable data from the display. A standard LCD screen displays bit transmission data corresponding to human readable data, and transmits the bit transmission data to a machine vision system, such as by use of the camera on a smart phone. The captured bit transmission data is converted into a bit data stream for further processing, such as by use of an application in the smart phone, and can be stored in memory and/or transmitted to another system to provide useful human readable information. Faster transmission of a greater amount of data is realized including, in one aspect of the bit generation, data error and correction codes. In one embodiment the method and system is applied in a body composition scale application using a four digit, 7-segment LCD.

18 Claims, 5 Drawing Sheets

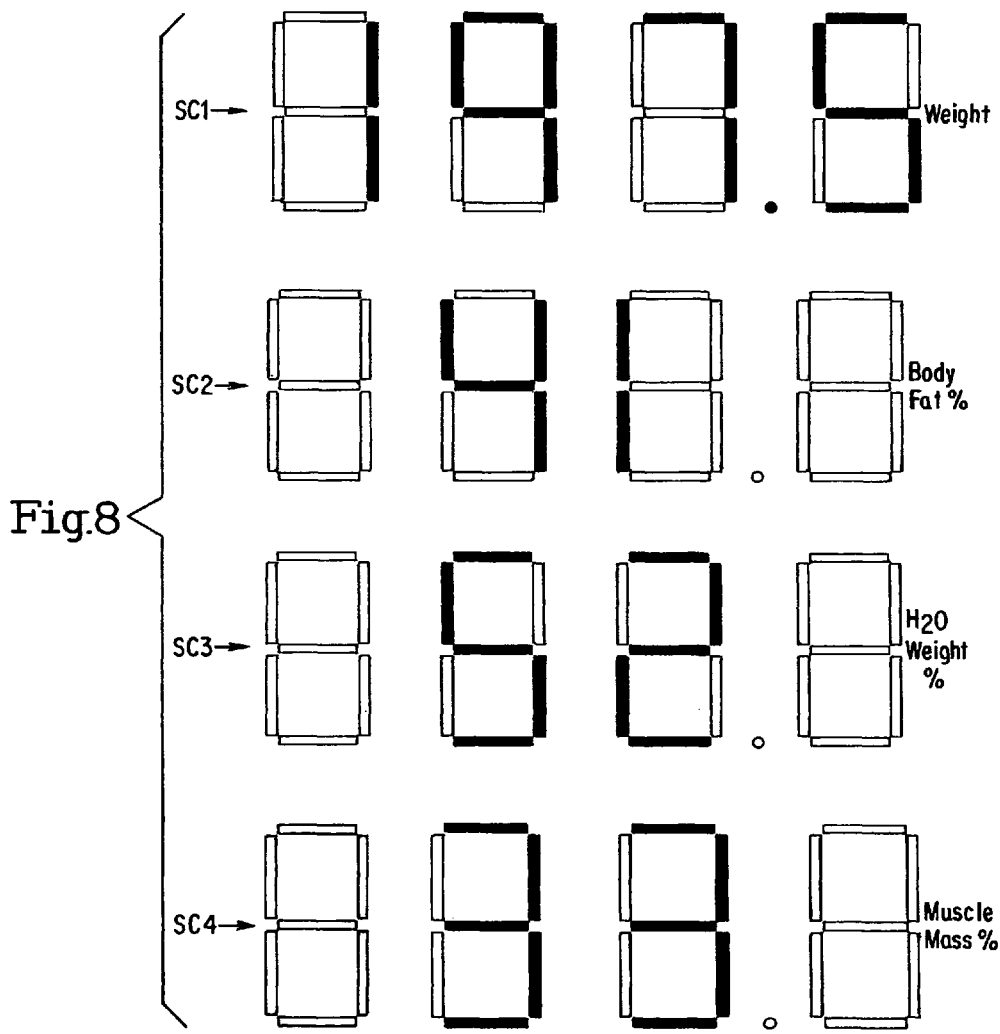

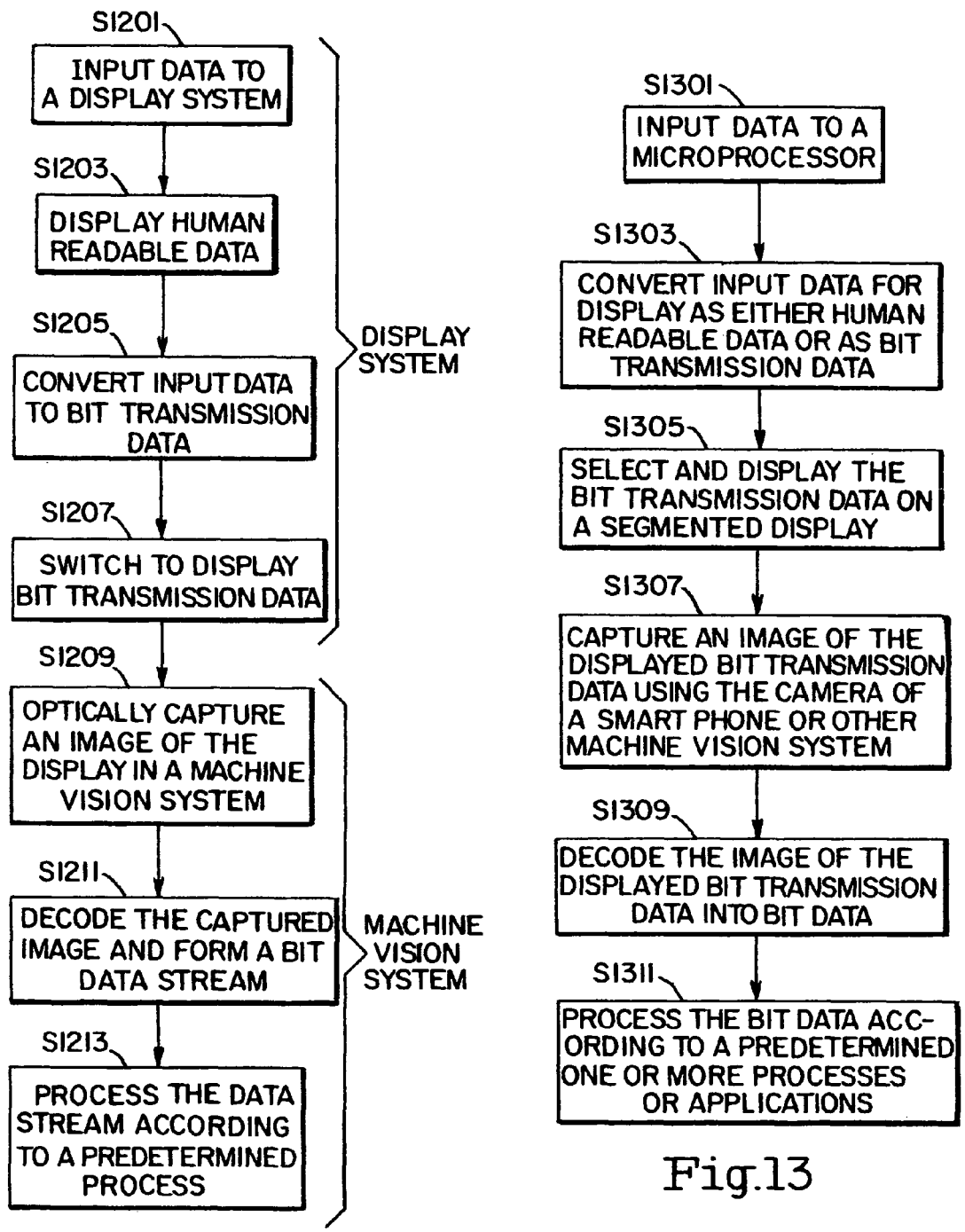

LCD BIT DISPLAY AND COMMUNICATION SYSTEM

BACKGROUND OF THE DISCLOSURE

1. Field of the Disclosure

The disclosure relates to transmittal of data from a liquid crystal display (LCD), and more particularly, to an alternative use of a standard LCD screen for transmitting bit transmission data to an optical receiver.

2. Background Information

LCDs are widely used to display alphanumeric characters and other information. Typically, LCDs are used to communicate information in human readable format. However, this is a very inefficient method for transmitting information from system to system. It is especially inefficient, for example, when it is desired to transmit the displayed information for further processing or storage. One convenient manner for transmitting the displayed information is to do so optically and capture the information at a receiver by taking a picture of the display. However known apparatus and methods for doing this are limited by the few numeric or other characters that are shown on the LCD display, resulting in a limited amount of information able to be transmitted. A need exists for communication apparatus and methods that can optically transmit information from an LCD more efficiently, reliably and cost effectively.

SUMMARY OF THE DISCLOSURE

The disclosure describes a novel way to repurpose a standard product display, such as an LCD, to transmit data optically from a product display to a machine vision system in a secondary device, such as a smart phone, using an optical receiver, such as a smart phone's charge-coupled device (CCD) camera. The disclosure provides for one or more of the following: displaying, converting, switching, capturing, decoding, processing and using displayed information in a bit data communication system structure. Embodiments of the disclosure provide these steps and accompanying structures with use of a smart phone's camera to capture the optically transmitted information from a display using the disclosure's structure and method that provides for the capturing and processing of more information quicker, and with data check and error correction capabilities in the resulting bit data structure. The disclosed disclosures give more efficient and reliable methods and systems for transmitting human readable information from a display in a bit transmission data format.

A described display system includes a microprocessor configured to receive input data and to output data in predetermined formats of human readable data and of bit transmission data corresponding to the human readable data, and comprising a converter for converting the input data to the predetermined formats. Data is inputted to the microprocessor as input data. A display is operationally connected to the microprocessor to receive display data in one of the predetermined formats for display as displayed data suitable to be optically received by a machine vision system. A switch is operationally connected to the microprocessor and the display to select between a first display of the human readable data and a second display of the bit transmission data.

The machine vision system comprises a smart phone, and the display system is a display formed of segments, such as a liquid crystal display (LCD).

A communication system is also described for selectively displaying human readable data or corresponding bit transmission data, and optically transmitting a selected display to a machine vision system. The display system acting as the transmitter component of the communication system includes a microprocessor configured to receive input data and to output data in predetermined formats of human readable data and of bit transmission data corresponding to the human readable data. A converter, either as part of the microprocessor or as a separate component, converts the input data, inputted at an input terminal of the microprocessor, into the predetermined formats. A display is operationally connected to the microprocessor to receive display data in one of the predetermined formats for display as displayed data suitable to be optically received by a machine vision system. Both display formats can be displayed either selectively or at the same time with use of a suitable display. A switch is operationally connected to the microprocessor and the display to select one of the predetermined formats as the displayed data.

The machine vision system acting as the receiver in the communication system includes an optical receiver for capturing an image of the displayed data. In a preferred embodiment, the displayed data consists of the bit transmission data and the machine vision system includes a decoder for decoding the image of the displayed bit transmission data into bit data, and a processor for processing the bit data according to a predetermined process.

A smart phone is a preferred machine vision system with the camera of the phone used to capture the image of data shown on the display. The display is a display formed of segments, such as a LCD. The decoder of the machine vision system is configured to decode at least one image so to form a bit data stream which optimally is comprised of at least one of an error detection code or an error correction code. The error detection code and/or error correction code do not have to be included in the bit data stream. More than one image can be decoded to form a bit data stream from one or more displays of bit transmission data.

A method is presented for transmitting information from a segmented display that uses the steps of converting human readable data into a corresponding bit transmission data, visually displaying the bit transmission data on a display comprising segments, capturing an image of the displayed bit transmission data in a machine vision system, decoding the image into bit data, and processing the bit data according to a predetermined process. The processing of the received bit transmission data into bit data allows for the use, storage and/or further transmission of the bit data faster and more efficiently in providing human readable information within the smart phone or at other locations by transmitting the bit data from the smart phone.

The bit data can form a bit data structure, from one or more captured images from the display, that include error detection and/or error correction codes, and the processing of the bit data can be carried out by use of an application in the smart phone.

The disclosure also relates to a data transfer method involving the steps of converting input data into a bit transmission data format, displaying the bit transmission data on a segmented display, optically transmitting the bit transmission data from the display to a machine vision system, decoding the transmitted bit transmission data to form bit data, and processing the bit data according to a predetermined application to produce human readable information.

BRIEF DESCRIPTION OF THE DRAWINGS

A full understanding of the disclosure can be gained from the following Detailed Description of the Preferred Embodiments when read in conjunction with the accompanying drawings in which:

FIG. 7 is an example showing the encoding of a data stream.

FIG. 8 shows sample LCD readout of weight and body fat percentage.

FIG. 12 is a flowchart of one exemplary method for transmitting displayed data from a display system to a machine vision system.

FIG. 13 is a flowchart showing the method where input data is converted into different display formats for selectively presenting a format on the display.

DETAILED DESCRIPTION OF THE PREFERRED EMBODIMENTS

The disclosure presents a simple, cost effective display system, communication system and method for transmitting binary information from a display device using the device's existing hardware display capabilities. The communication system and method requires two systems: a machine vision system, such as that found in a smart phone, which functions as a receiver; and a display system, such as an LCD product display, that functions as a transmitter.

Overall Configuration of the Communication System

Figure 1:
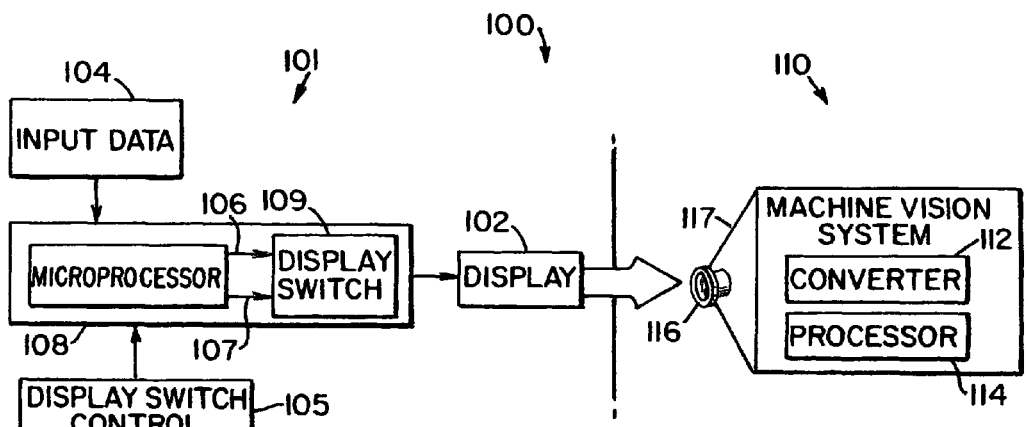
FIG. 1 is a block diagram according to an aspect of the disclosure for transmitting display data to a machine vision system.

FIG. 1 is a block diagram of a communication system 100 according to an aspect of the disclosure. Input data 104 represents data inputted to a data input port, represented by the arrow, of a microprocessor 108. The input data is converted by the microprocessor to human readable data 106 and bit transmission data 107. Based on the selection of display switch 109, either the human readable data or the bit transmission data is coupled to and shown on the LCD 102. The LCD display 102 is not necessarily limited to an LCD but can be any display formed of segments so that input data can be shown as bit transmission data by use of the segments that make up the display. Lexicon as used herein is as follows:

Input Data, such as Input data 104 in FIG. 1, is data that is input to the microprocessor and could include key presses or sensor readings and the like, in both analog or digital format.

Human Readable Data is the data that results from the microprocessor converting input data to a format that will be shown in human readable form, or in a human readable format, on the LCD, such as by use of alpha and numeric (alphanumeric) characters.

Transmission Data is data that results from the microprocessor converting input data to a format that can be transmitted system to system and will be shown on the LCD in a format that is not necessarily human readable. This is used herein with respect to the bit transmission data, or bit transmission data format, that results from the conversion of either input data, or human readable data(s), to a corresponding bit transmission data format that is sent to and displayed on the display.

Communication system 100 consists of a LCD display system 101 which is also the system transmitter, and a machine vision system 110 as the system receiver. LCD display system 101 contains a display 102 connected to a microprocessor 108. It is understood that microprocessor 108 could be a part of a computer or other data processing and control component. A data input 104 and display switch control 105 are connected as inputs to the microprocessor. Input data 104 is inputted to an input terminal of the microprocessor. Input data is converted to human readable data which is outputted at 106 to display switch 109, and to bit transmission data which is outputted at 107 to display switch 109. Preferable display switch 109 is a component of microprocessor 108 as shown in FIG. 1 as the display switch is normally internal to the microprocessor, although alternatively the display switch could be external to the microprocessor. The microprocessor is configured to convert and process the inputted data or information for display on display 102. The conversion and processing of input data could be performed by a converter component separate from the microprocessor but preferably and as shown in FIG. 1, the conversion and processing as necessary is included within microprocessor 108.

Display switch 109 enables a user to switch the display 102 to show either the human readable data 106 or the bit transmission data 107 by use of display switch control 105. In a preferred embodiment, display switch 109 is inside microprocessor 108 and coupled through the microprocessor to display 102 so to selectively switch the display to show either a first display of human readable data or a second display of bit transmission data. Display 102 in FIG. 1 transmits data by visually displaying data in a selected data format. In one embodiment of the disclosure, data display 102 is an LCD 4-digit display with each digit display formed in segments. This displayed information or data is transmitted to a machine vision system as the receiver.

Configuration of the Receiver, Machine Vision System

Machine vision system 110 contains a photographic image capture device 117 that includes an optical lens 116. Photographic image capture device 117 may contain other components such as a focus mechanism or circuits and a front end digital image processor, not shown in FIG. 1. The machine vision system contains a processor 114 that includes an image processor for processing information received by image capture device 117 and for conducting further image processing beyond the optional front end digital image processor. Processor 114 may also include one or more applications (apps) (not shown) for running the one or more predetermined applications according to a user's preference. A converter 112 converts bit transmission data transmitted from display 102 and received through optical lens 116 to bit data. Processor 114, converter 112 and image capture device 117 are coupled to one another for performing the receiver and processing functions of the machine vision system. The machine vision system is also referred to herein as the receiver of the described communication system.

Machine vision system 110 in a preferred embodiment is built on a smart phone platform and makes use of the smart phone's camera input device and processor, as well as the availability of a smart phone's transmitter and smart phone applications for processing and displaying information according to the user's preference.

Configuration of the Transmitter, Optical Display System

The display can be any type of display that is formed by segments. An LCD is an attractive display type to use because of its widespread use and because of the structure of the LCD screen is formed in segments. This makes it suitable for using those segments to display information in either a human readable data format or in a corresponding bit transmission data format. However, any type of visual display that optically transmits its displayed information, and is formed of segments or is capable of being broken down into segments by an imaging device, is usable as display 102.

In one embodiment, the display system can be packaged as a self-contained, portable single unit so that it can be placed with a product, for example, to project the desired information. The display system according to this embodiment can be easily moved to any desired location.

In an alternative embodiment, the display itself is remotely connected to a central computer, microprocessor or other data processing equipment. As one example, a grocery store would be able to route the display to the store's centralized computer system. The data input can be at any location and connected into the display system. For example, the data input could be in the centralized computer area or in a different office area used for updating grocery store prices, as just an example. The data input could also be on the display itself, and there could be multiple data inputs at more than one location for a single display.

Likewise, the display switch in this alternative embodiment can be placed remote from the display itself, such as in a centralized computer area, or in a separate room where work is conducted relating to the displayed information, as examples. The display switch could also be on the display itself, and there could be multiple data inputs at more than one location for a single display.

Figure 2:
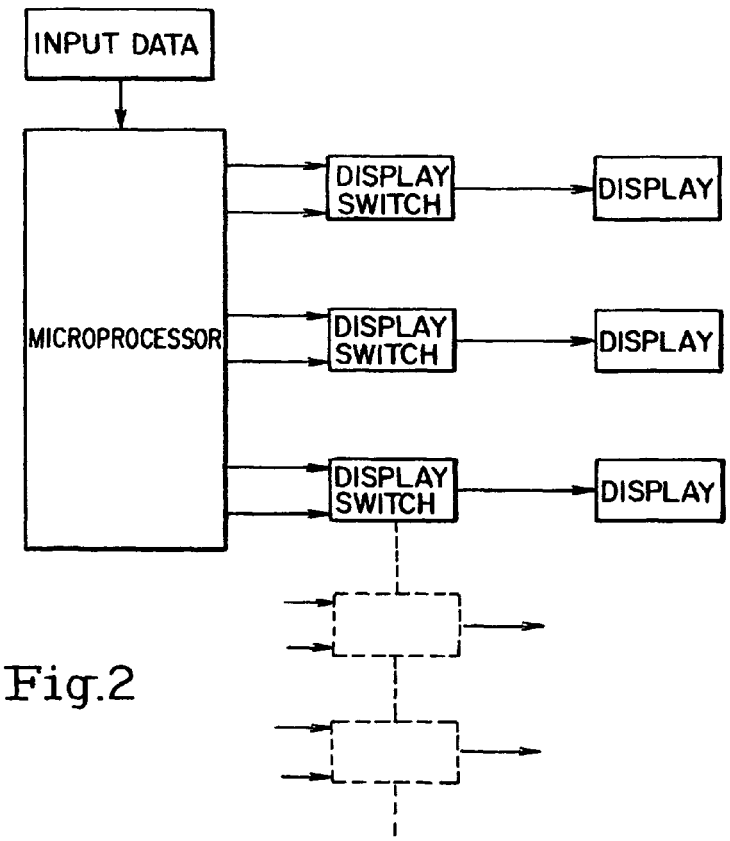
FIG. 2 is a block diagram illustrating the use of multiple display switches to control multiple displays in displaying a selected data format on each display.

FIG. 2 shows an embodiment where there are multiple display switches connected to the microprocessor for selectively switch for a display of either human readable data or of bit transmission data.

Figure 3:
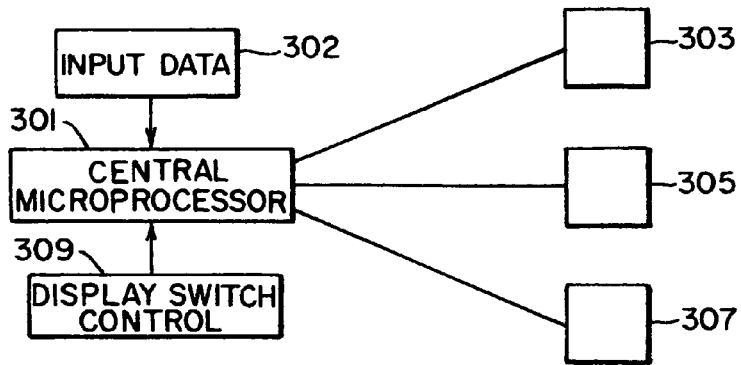
FIG. 3 is an illustration of an embodiment where display switch commands are centralized at the microprocessor in controlling a plurality of displays.

FIG. 3 shows still another embodiment where a central computer, microprocessor or other data processing module 301 is used to control the display information on a plurality of displays 303, 305, 307. Although only three displays are shown in FIG. 3, it is understood that any number of displays could be used in this arrangement. A single input data 302 can be used as shown in FIG. 3 with each display coded so that data can be inputted at one location for all of the plurality of displays. Similarly, a single input display switch control 309 can be used to switch data in a selected format to a particular display by use of coded displays. If a suitable display is used, both data formats could be selected for display at the same time. While FIG. 3 shows the input display switch connected to the central microprocessor 301, alternatively, some or all of the display switches associated with respective displays can be located remotely from the microprocessor.

The features and benefits of converting input data into a bit transmission data format are further explained as follows.

Figures 4, 5:
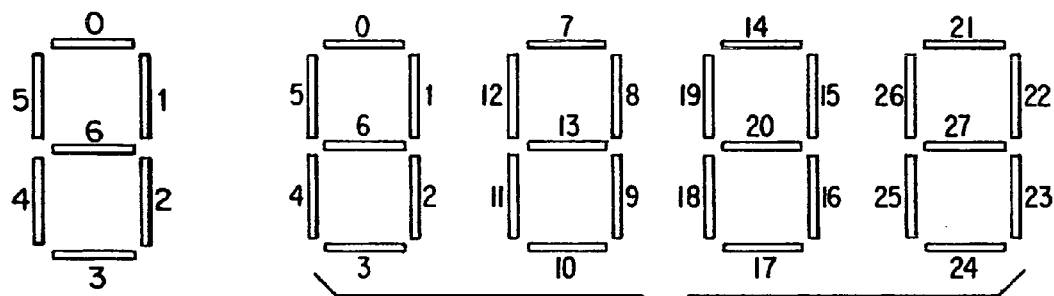
FIG. 4 is a typical seven segment LCD layout.
FIG. 5 shows four 7 segment displays mapped to a 28 bit binary stream.

FIG. 4 shows a typical seven segment LCD layout. The segments are labeled as segments 0 to 6. This is a common segment configuration used to display the numeric characters 0 to 9 inclusive as well as alpha characters. It is understood that as used herein, numbers listed as from one "to" another are inclusive so to include the first and last numbers listed. Of course any segment configuration could be used in a similar fashion for the display. For example, a dot matrix segment configuration, or a common 14 segment British flag configuration, could be used, as just two possible configuration examples. Display 102 in FIG. 1 may consist of one or multiples of the LCD display of FIG. 4. To display a human readable character, different segments are turned on or off to form the character. For example, in the single numeric LCD of FIG. 4, segments 0, 1 and 2 would be turned on to display the number 7 with all other segments off. In this scheme, only ten characters, 0 to 9, are being represented by these seven segments.

Much more information can be transmitted if the same LCD segments, such as those shown in FIG. 4, are used to transmit information in a format that is not necessarily human readable. Moreover, when information is passed in an alternate form, additional information can be included that improves the quality of the transmission. For example, error detection codes and error correction codes can be sent to validate the information that has been transmitted which improves the overall quality of the communication.

For example, if each of the seven segments of the LCD of FIG. 4 is used as a bit, then $2^7$ or 128 distinct codes are able to be transmitted. This is 12.8 times more efficient than simply using the segments to pass information in the human readable format of numeric characters 0 to 9. This additional efficiency makes it possible to transfer more data using the same number of segments which enables additional functionality due to expanded information transfer to a smart phone, or other optical receiver system.

In the communication scheme of the disclosure, each segment is mapped to a bit. If the segment is turned ON in displaying a particular number, that segment is a 1-bit. If the segment is turned OFF, that segment is a 0-bit. The conversion of displayed human readable data to a corresponding bit data format, referred to herein as bit transmission data, can be carried out by logic circuitry or by use of a suitable software or application (app). Likewise, input data can be converted to bit transmission data by appropriate conversion and processing applications depending on the type of data inputted at input data 104 in FIG. 1.

In one embodiment, display switch 109 is used to select the data format of the information to be sent to and displayed on display 102. In a different embodiment, the input data 104 is only converted to human readable data and is displayed on display 102. Activation of a display switch then causes a conversion of the human readable data displayed to a corresponding bit transmission data. The display screen then changes to show the information of the human readable data in the corresponding bit transmission data format on display 102. Alternatively, conversion is activated automatically when the human readable data is first displayed, or after a predetermined amount of time has passed from when the human readable data is first displayed. The converted display information is stored in memory and when the display switch is activated to change the display from human readable data, the bit transmission data is retrieved from storage or memory and projected on the display.

In another alternative embodiment, the switching of the display screen can be done remotely, such as by sending a particular transmit code, which could be a single digit or symbol from a smart phone. This allows the user not to have to physically touch a switch button on the display or have physical access to the display.

Machine vision system 110 captures the image from the display of the bit transmission data transmitted from the display. If the display is a single numeric display as in FIG. 4, then the captured image is formed of the 7 segments 0 to 6. If the display is a four digit display as in FIG. 5, then the captured image is formed of 28 segments 0 to 27 as indicated in FIG. 5. The machine vision system decodes the data in the captured image by mapping different regions of the image to a single LCD segment and thereby a single data bit. The machine vision system analyzes the image to determine if the segment in a mapped region was turned ON for a 1 bit transmission or OFF for a 0 bit transmission. Different segments are strung together to form a data stream of 0's and 1's and thereby a communication channel. The mapping and decoding is carried out by circuitry, programs or applications that analyze segments of the display and convert their ON or OFF state into a string of bit data.

FIG. 5 shows four seven-segment displays. The 28 segments are mapped from bit 0 to bit 27. It is important to note that any display with segments, or capable of being dissected into segments, could be mapped for the purpose of transmitting data according to the disclosure. In the example given of FIG. 5, we can now transfer 28 bits instead of four numeric characters. Furthermore, large data sets can be transmitted by simply stringing together different single screen transmissions over time.

Alternate Embodiment: Bit Image Conversion Performed in the Receiver

Figure 6:
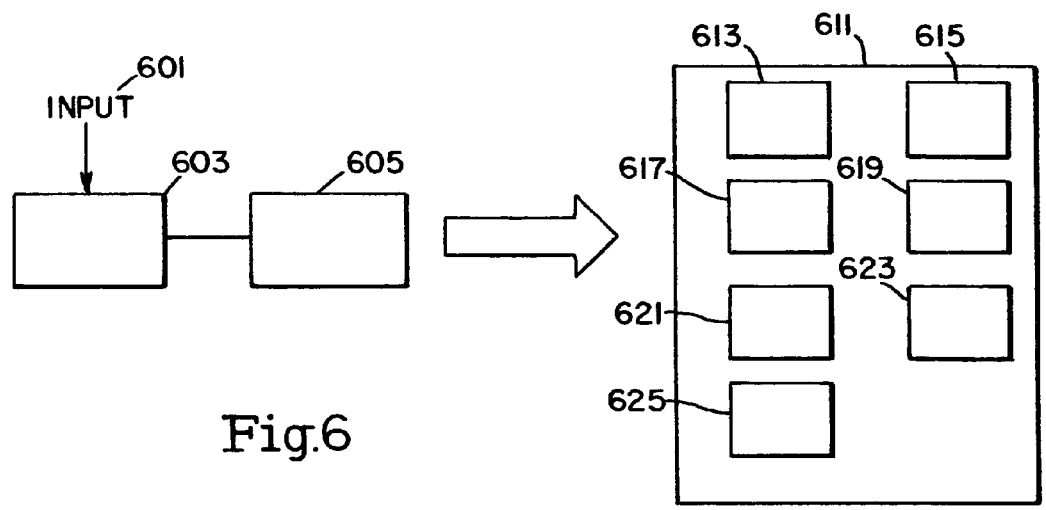
FIG. 6 is a block diagram illustrating the communication system with the image conversion in the receiver.

In an alternative embodiment, the conversion to bit transmission data can take place in the machine vision system after displayed human readable data is transmitted from the display and captured in the machine vision system. FIG. 6 is a block diagram that illustrates the embodiment where the conversion to bit data is conducted at the machine vision system. In this embodiment, the receiver interprets each segment of the LCD and from this interpretation it determines what human readable data is being transmitted. FIG. 6 shows components for the described communication system in this alternative embodiment where the conversion of displayed human readable information is performed in the receiver machine vision system. FIG. 6 presents the basic components and is not necessarily all inclusive of other components that may be included in the communication system.

When the conversion is performed in the receiver, information in only human readable format is transmitted. In this embodiment, information to be displayed is inputted at input 601 to a display interface module 603. Display interface module 603 could be a computer or a microprocessor or other component that serves to format the inputted information into a human readable format for presentation on display 605. Display 605 can be any type of display that forms its display by selective activation of individual segments that make up the display. Display 605 presents a visual representation of data that is optically transmitted and received by machine vision system 611. The optical transmission occurs simply by the illuminated display screen that optically transmits the displayed information to any viewer, which in this embodiment is machine vision system 611.

Machine vision system 611 includes an optical lens system 613 for capturing the image projected on display 605. This could be a charged coupled device (CCD) in the camera of a smart phone. It could be any device for capturing an image, such as simple a camera used to take a picture or photograph. A digital image processor 615 processes the captured image into a digital image. Smart phones have this capability built into them which makes a smart phone an ideal device to use as the machine vision system. However, any device or system can be used designed to capture an image that is transmitted optically to an optical lens or to other equipment that can receive the optically transmitted, or viewed, image from the display.

Once the human readable image is captured at the receiver, the image is converted in the receiver into a bit data format by analyzing individual segments of the display, as described above in the embodiment where the conversion is performed in the display system. A bit code converter 617 uses the segments of the display to convert the segments into bit transmission data, as previously discussed with respect to other embodiments. A conversion process is performed on the bit transmission data in the same manner as it is performed on bit transmission data transmitted to the receiver from the display, as in previous embodiments. A memory 619 is used to store information according to a predetermined program or application used in connection with the processing of the captured image from display.

Applications (apps) 621 are a part of the receiver for running specific programs as selected by the user, which can selectively display information on a receiver screen 623. Transmitter 625 provides the capability for transmitting information as bit data or a bit data stream to one or more other destinations for further use of the information from display 605. Although not shown in FIG. 6, it is understood that the components of machine vision system 611 are coupled to one another in known arrangements for carrying out the functions and capabilities of the machine vision system.

Transmission of Multiple LCD Images

More than one display of, or conversion to, bit transmission data can be the subject of the communication. In this case, the bit data corresponding to the first display image, resulting from conversion of the bit transmission data, is added onto by the next bit data from the second display image to form a bit data stream. This continues with any number of succeeding images. A receiver has various options by use of available applications and programs, for example, as regards use of the bit data, or bit data stream the size of which depends on the number of images that is the subject of a particular communication.

The bit data can be stored in memory, added to by subsequent bit data streams, and later retrieved from memory, converted to a desired format, such as graphical or text, and displayed on a display to visually present the data graphically, and/or to show data variation over time, just as two examples. In an alternative embodiment, the data can be transmitted to other locations with or without interim memory storage of the bit data. For example, the data can be sent to a hospital or other medical offices if it relates to health care or a personal body composition matter, such as changes in glucose levels over time as but one example. In still another embodiment, the receiver can collect various captured images, convert them to bit data, and process the bit data for displaying the various images in a single readable format for use by an end user of the information. This gives the benefit of transmitting much more information, faster, using bit transmission data and being able to view one or a plurality of images.

The numerous applications and programs available and compatible for processing bit data makes the system and method of the disclosure have broad applications in the transmittal and processing of information shown on an inexpensive and commonly available type of display.

Representative Applications of the Preferred Embodiment

The following are examples of some applications, or fields of use, for the disclosed communication system in a preferred embodiment where the machine vision system as the receiver is a smart phone, and the display consists of four, seven-segment LCD displays:

Food scale. Use to transmit portion control weight to a smart phone app that combines the weight with the food type to show nutrition information adjusted to the portion size.

Body scale. Use to transmit weight and body analyzer metrics to a smart phone app so weight can be tracked over time.

Glucose monitor. Use to transmit blood glucose levels to a smart phone app so blood glucose trends can be monitored over time and shared with health professionals.

Pedometer use. Upload daily activity information to a smart phone app by use of disclosed systems and methods. When combined with user profile information such as height, weight and age, calorie burning information can be calculated and shown over time.

Details will be presented for a body scale, also referred to as a body composition scale, as one application of the disclosure.

Example of One Field of Use—as a Body Composition Scale

Body composition scales are common health tools that provide the user information on their health. The information provided includes things such as weight, body fat percentage, muscle mass percentage and water weight percentage.

In this embodiment, the user wants to track body composition information over time to follow his/her weight loss progress. Most body composition scales take a snapshot and provide information at one point in time. The user instead in this embodiment would like to track progress by seeing how the body composition metrics are changing over time.

With the disclosed systems and method, the user can periodically transmit the body composition scales snapshot information to record data points on a smart phone. The smart phone then tracks and presents this information over time, thereby adding value to the user by showing her weight loss progress.

The following describes this one exemplary application of the preferred embodiment of the disclosure for analyzing body data from inputting data from a body scale measurement. Assume that the display 102 of FIG. 1 is a four 7-segment display as in FIG. 5. Mapping human readable displayed information of the four 7-segment display produces a bit arrangement as shown in FIG. 7 as a communication scheme for this body composition scale example.

In this example, converting human readable information, such as that shown in FIG. 8, to bit data of a body scale and encoding the corresponding bit data into the data stream format of FIG. 7 gives several distinct advantages.

Figure 9:
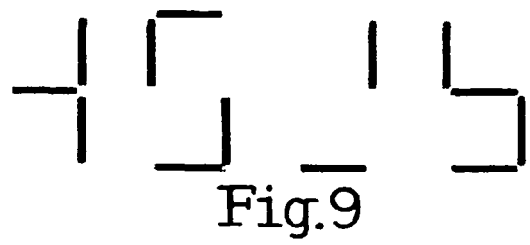
FIG. 9 shows a sample display in a bit transmission data format.

1. More information can be transmitted—for example, only one screen is required to transmit four values as illustrated in FIG. 9, rather than four different screens being required as illustrated in FIG. 8.
2. The information can be transmitted more quickly—4 numbers transmitted simultaneously as illustrated in FIG. 9, rather than requiring separate different transmissions.
3. The transmission is more reliable—the Error Detection Code helps signal errors in the data transfer.

The system would work as follows, using the embodiment where the bit data conversion takes place in the transmitter:

Step 1: User weighs herself to get a body composition measurement at one point in time.

Let us assume that the user is a 34 year old female, and by stepping on the scale, body composition measurements are generated as follows:
1) Weight: 197.5 lbs.
2) Body Fat Percentage: 41%
3) Water Weight Percentage: 52%
4) Muscle Mass Percentage: 33%

The conversion from human readable information to a corresponding bit data display is carried out using a single LCD display consisting four 7 segment displays. This single 4 character screen shows four different measurements, or figures, over time, such as the four number sets shown in FIG.

8. A built in feature of the product is that when the user presses a button, such as display switch control 105 (FIG. 1), all four figures are compacted into a single data stream of 28 bits (FIG. 7). Thus in a step 1, the user reads the data in human readable format, then presses a button on display switch control 105. In step 2, all the human readable data are compacted down into the single 28 bit segment (FIG. 9). While four 7 segment LCDs are used in this example, it is understood that any number of LCD segments could be used for the display screen. This conversion of human readable data to a corresponding bit transmission date results in more information being able to be transmitted. Each 28 bit segment is optically transmitted to the receiver. FIG. 8 presents the four measurements of this example. The first screen display, SC 1 in FIG. 8, displays the weight as 197.5. The second screen display, SC 2, displays the body fat composition measurement as 41. The third screen display, SC 3, displays water weight percentage as 52, and the fourth screen display, SC 4, displays muscle mass composition as 33. The display can be configured to show each measurement at predetermined intervals, such as having each measurement being displayed for two seconds, just as an example, and automatically rotating through the different screen shots. The user can press a button on the display switch control to have all 4 human readable information compacted into a single encoded data packet stream, such as that having the data structure of the encoded data stream as shown in FIG. 7.

In the receiver, the four 28 bit segments of this example, is converted into a single encoded data stream in the bits 0-27 format as shown in FIG. 7, where bit 0 is the most significant bit (MSB) and bit 27 is the least significant bit (LSB). The encoded data stream can then be stored, processed, and/or further transmitted elsewhere for use of the information.

In this example, (1) the first 10 bits correspond to Weight (bits 0-9, with most significant bit first). 10 bits give 1024 codes. The weight number 197.5 is transmitted in half pound increments. Therefore, the code to be transmitted is 197.5*2 or 397 (0110001101b).

(2) The next 6 bits correspond to Body Fat % (bits 10-15; most significant bit first). 6 bits give 64 codes. The Body Fat range is limited from 5% to 45% and is coded as follows:
Less than 5% is code 4
5% to 45% is coded as the number 5 to 45
Greater than 45% is code 46
All other codes are not applicable (n/a).
Therefore, 41% would be coded as 41 (101001b).

(3) The next 5 bits correspond to Water Weight % (bits 16-20; most significant bit first). 5 bits result in 32 codes. The Water Weight range is limited to 45 to 65 or 20 codes, and is coded as follows:
Less than 45% is code 0
Water Weight 45% to 65% are setup as codes (Water Weight—44) which results in codes 1 to 21.
Greater than 65% is code 22.
Therefore, 52% Water Weight is coded as 8 (01000b).

(4) The next 5 bits correspond to Muscle Mass % (bits 21-26; most significant bit first). 5 bits result in 32 codes. The Muscle Mass range is limited to 27% to 59%.
27% or less is coded as 0.
28% to 58% is coded as the Muscle Mass Percentage minus 27 or codes 1 to 30.
59% or greater is coded at 31.
Therefore, Muscle Mass Percent of 33% would be coded as 6 (00110b).

(5) The next 2 bit are checksum—In this case will just say the checksum is code 3 (11b).

Therefore the 28 bit code to transmit is as follows:
Code: (0110001101b)(101001b)(01000b)(00110b)(11b)
0110001 1011010 0101000 0011011

On the display screen, this data would be presented as shown in FIG. 9 based on the bit stream and the above data map.

Step 3: A smart phone captures the transmitted information and records it along with previously recorded data transmissions along with any other contextual information required, such as date and time of the transmission.

The smart phone images the display, uses machine vision techniques to translate the LCD display segments back to bits, assembles the data stream, unpacks the data and translates it to actual Weight, Body Fat %, Water Weight % and Muscle Mass %.

This information is stored in the smart pone app based on data received.

Step 4: Smart phone displays progress.

Figure 10:
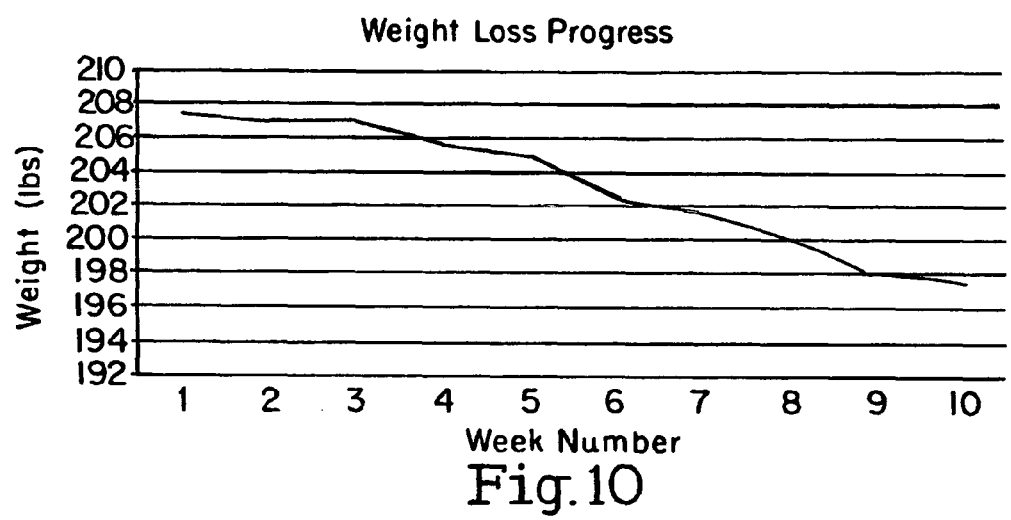
FIG. 10 is a graph of a sample display of recorded data showing weight change over time.

The smart phone app can now use the recorded data to produce charts, graphs and other information to display results in various ways, such as in the sample graph format as shown in FIG. 10.

Figure 11:
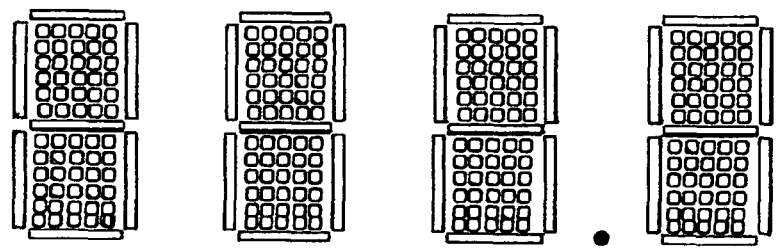
FIG. 11 shows an alternative layout of an LCD display.

It is important to note that the LCD display and corresponding segment map could be built with nearly any layout. For example, the alternative LCD layout shown in FIG. 11 would increase the amount of data that could be sent in one transfer from 28 bits to 28+30*8 or 268 bits.

The incremental cost to implement the system is negligible which is of particular benefit to both individual and commercial users. When a smart phone is used as the machine vision system, this provides the highly desirable integration of the functionality of an available product to the LCD display system of this disclosure. For example, this allows the disclosure to be used with smart phone apps, such as MyFitnessPal® from MyFitnessPal, LLC, when used in the described body composition scale application.

Referring now to FIG. 12, there is shown a flowchart of one method for transmitting displayed data from a display system to a machine vision system in according to one aspect of the disclosure where the conversion takes place after the human readable data is displayed on display 102. At step S 1201, data is inputted at input data 104 of FIG. 1 to the display system. At step S 1203, the inputted data is displayed as human readable data on display 102. At step S 1205, the human readable data is converted to a corresponding bit format as bit transmission data. At step S 1207, the user switches from a first display in human readable data format to a second display in bit transmission data format. At step S 1209, the second display is transmitted and optically received or captured as an image of the display in a machine vision system. At step S 1211, the captured image, which may be one or more images, is decoded to form a bit data stream. At step S 1213, the bit data stream is processed according to a predetermined process. For example, the processing may comprise the storing of data into memory, converting the bit data stream into human readable data and/or the outputting of the human readable data as text and/or as a graphical representation of accumulated data over time.

Next, with reference to FIG. 13, an explanation will be given of the operation of the bit communication system apparatus when the input data is converted into different display formats for selection of which format to present on the display.

As shown in FIG. 13, in step S 1301, input data, which can be from a keyboard, a sensor, or other input device, is inputted to a microprocessor.

In step S 1303, the microprocessor converts the input data into a human readable data format suitable for display. This, for example, could be a body weight with the input data coming from a body weight scale sensor apparatus. The microprocessor also converts the input data into a bit transmission data format suitable for display, which corresponds to, but is not displayed the same as, the human readable data. The conversion is performed for a segmented display, that is, one in which alphanumeric characters are able to be displayed based on the activation of selected segments of the display, such as the typical seven segment LCD display of FIG. 4, or the LCD display of FIG. 5 that shows four 7-segment displays that can be mapped to a 28 bit binary stream by use of the segments of the displays, or a display using an alternative layout, such as that shown in FIG. 11.

In step S 1305, the user selects which data format is to be projected on the display. This could be conducted by a switch mechanism, which could be a part of the microprocessor, or external to the microprocessor, such as being located in the vicinity of the display or elsewhere. In this embodiment, the user selects the bit transmission data which is then projected on the display. FIG. 9 shows a sample of a bit transmission data display, this one corresponding to the body composition scale exemplary application of the disclosure.

In step S 1307, a machine vision system, such as the camera of a smart phone, acquires or captures an image of the displayed bit transmission data by taking a picture of the display.

In step S 1309, a decoding of the acquired image of the bit transmission data is performed to produce its equivalent bit data. This decoding is based on an analysis of which segments of the acquired image were activated on the display. One or more images can be acquired and decoded to form bit data that is assembled as a bit data steam in a encoded format, such as that shown in FIG. 7, as just one example.

In step S 1311, the bit data is processed according to one or more processes or applications. For example, bit data could be stored in memory, such as by use of one or more buffers. In one representative application, the stored data could reflect information reflective of weight change over time, and projected when desired into a graph format, such as that of FIG. 10 as an example.

The bit data could also be transmitted to another location(s) for further processing and use. An example of this would be where health information is inputted, such as food portion and type ingested, or blood glucose levels detected, or body exercise data along with the exerciser's profile traits such as height, weight and age. This type of inputted data is converted to bit transmission data, its displayed image is acquired and converted to bit data, and the bit data stored, processed and/or transmitted elsewhere for further use as desired. In the examples, this kind of information is typical information for transmission to a hospital or other medical office.

Readily available or customized smart phone applications can be used for specific uses and applications of the disclosure. The off-the-shelf access to numerous smart phone applications makes the smart phone an attractive device to use as the machine vision system, for both convenience and low cost in carrying out the features and realizing the benefits of the disclosure. It is understood that "data" as used herein includes "datas" meaning data consisting of multiple data.

While specific embodiments of the disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosure which is to be given the full breadth of the claims appended and any and all equivalents thereof.

What is claimed is:

1. An information transfer system comprising
a) a microprocessor configured to receive input data and to output data in predetermined formats of human readable data and of bit transmission data corresponding to the human readable data using a seven segment LCD layout, and comprising a converter for converting the input data to predetermined bit format;
b) at least one data input for inputting the input data to the microprocessor;
c) at least one LCD display operationally connected to the microprocessor to receive display data in one of the predetermined formats for display as displayed data optically receivable by a machine vision system, said display allowing for display of both the human readable data and the machine readable data, wherein both of the predetermined formats are switchably displayable on the LCD display;
d) at least one switch which selects between a first display of the human readable data and a second display of the bit transmission data;
e) at least one photographic image capture device, each said at least one photographic capture device comprising a lens;
f) a machine vision system, said machine vision system capturing the image from the display of the bit transmission data transmitted from the display, said machine vision system comprising;
  i) at least one converter, said at least one converter converting bit transmission data from said at least one display and received through said lens of said photographic image capture device; and
  ii) an image processor for processing information received by said at least one capture device.

2. The information transfer system of claim 1 wherein the machine vision system comprises a smart phone.

3. The information transfer system of claim 1, wherein the display switch is connected to the microprocessor.

4. The information transfer system of claim 1, wherein said at least one photographic image capture device is part of said machine vision system.

5. An information transfer system for selectively transmitting bit transmission data corresponding to human readable data to a machine vision system, comprising
a) a display system comprising:
  i) a microprocessor configured to receive input data and to output data in predetermined formats of human readable data and of bit transmission data corresponding to the human readable data using a seven segment LCD layout;
  ii) at least one data input for inputting the input data to the microprocessor;
  iii) at least one LCD display operationally connected to the microprocessor to receive display data in one of the predetermined formats for display as displayed data optically receivable by a machine vision system, said display allowing for display of both the human readable data and the machine readable data, wherein both of the redetermined formats are switchably displayable on the LCD display; and
    a switch operationally connected to the microprocessor and the display to select one of the predetermined formats as the displayed data, and
b) a machine vision system, said machine vision system capturing the image from the display of the bit transmission data transmitted from the display, said machine vision system comprising:
  i) optical lens system for capturing an image of the displayed data;
  ii) a digital image processor processing the captured image into a digital image;
  iii) a bit code converter using segments of the display to convert the segments into bit transmission data; and
  iv) a memory to store said bit transmission data according to a predetermined program.

6. The system of claim 5 wherein the machine vision system comprises a smart phone.

7. The system of claim 5 wherein the display comprises segments.

8. The system of claim 5, wherein the machine vision system comprises a camera for capturing the image.

9. The system of claim 5 wherein the decoder is configured to decode at least one image so to form a bit data stream comprising at least one of an error detection code and an error correction code.

10. A method for transmitting information from a segmented display comprising the steps of:
converting human readable data into corresponding bit transmission data,
visually displaying the bit transmission data on a LCD display comprising segments,
capturing an image of the displayed bit transmission data in a machine vision system,
decoding the image into bit data, and
processing the bit data according to a predetermined process, wherein both machine readable and human readable predetermined formats are switchable displayed on said LCD display.

11. The method of claim 10, wherein the processing of the bit data produces human readable information.

12. The method of claim 10, wherein the machine vision system is a smart phone.

13. The method of claim 12, wherein the capturing of an image of the displayed bit transmission data is performed using a camera of a smart phone.

14. The method of claim 12, wherein the processing of the bit data comprises use of an application in the smart phone.

15. The method of claim 10, wherein the bit data comprises an error detection code.

16. The method of claim 10, wherein the bit data comprises an error correction code.

17. The method of claim 10, wherein the capturing of an image comprises capturing a plurality of images.

18. A data transfer method comprising:
converting input data into a bit transmission data format suitable for use with an LCD;
displaying the bit transmission data on a segmented LCD display in a selectable human readable or bit transmission format wherein said displaying is switchable between a human readable and a bit transmission format;
optically transmitting the bit transmission data from the LCD display to a machine vision system,
decoding the transmitted bit transmission data to form bit data
processing the bit data according to a predetermined application to produce human readable information.

* * * * *